United States Patent [19]

Guenther

[11] 4,093,372
[45] June 6, 1978

[54] PRE-SEPARATED RECIRCULATING DOCUMENT COPYING SYSTEM

[75] Inventor: Joachim Guenther, Webster, N.Y.

[73] Assignee: Xerox Corporation, Stamford, Conn.

[21] Appl. No.: 781,811

[22] Filed: Mar. 28, 1977

[51] Int. Cl.² .................. B65H 5/22; G03B 27/48
[52] U.S. Cl. ................................. 355/50; 271/3.1
[58] Field of Search ........................... 355/47–51, 355/75, 3 R, 8, 11, 14, 16; 271/DIG. 9, 3.1, 4, 9, 64, 245

[56] References Cited

U.S. PATENT DOCUMENTS

| | | | |
|---|---|---|---|
| 3,552,739 | 1/1971 | Roberts et al. | 271/4 |
| 3,659,837 | 5/1972 | Umahashi | 271/9 |
| 3,844,552 | 10/1974 | Bleau et al. | 271/245 |
| 3,937,454 | 2/1976 | Colwill | 271/3.1 X |

FOREIGN PATENT DOCUMENTS 581,064  10/1976  Switzerland ............ 271/3.1

Primary Examiner—Donald A. Griffin

[57] ABSTRACT

An automatic document handling system for repeatedly recirculating a set of individual documents past the imaging station of a copier in a pre-collated order to make multiple pre-collated copy sets therefrom, in which each individual document is maintained partially separated from the others in the set during their copying recirculation by shingling all the documents in a partially separated, partially overlapping, configuration during a portion of the recirculation, so that the individual documents are readily fully separated for being individually copied, yet a simple and compact document recirculation path is provided. This system preferably further includes an arrangement for engaging only the partially pre-separated portion of an individual document on one side of the shingled set and advancing that document to the imaging station and then returning that document to the other side of the shingled set in a position which maintains its partial separation. Additionally, automatic initial pre-separation and loading of an initially unseparated stack of documents may be provided.

13 Claims, 2 Drawing Figures

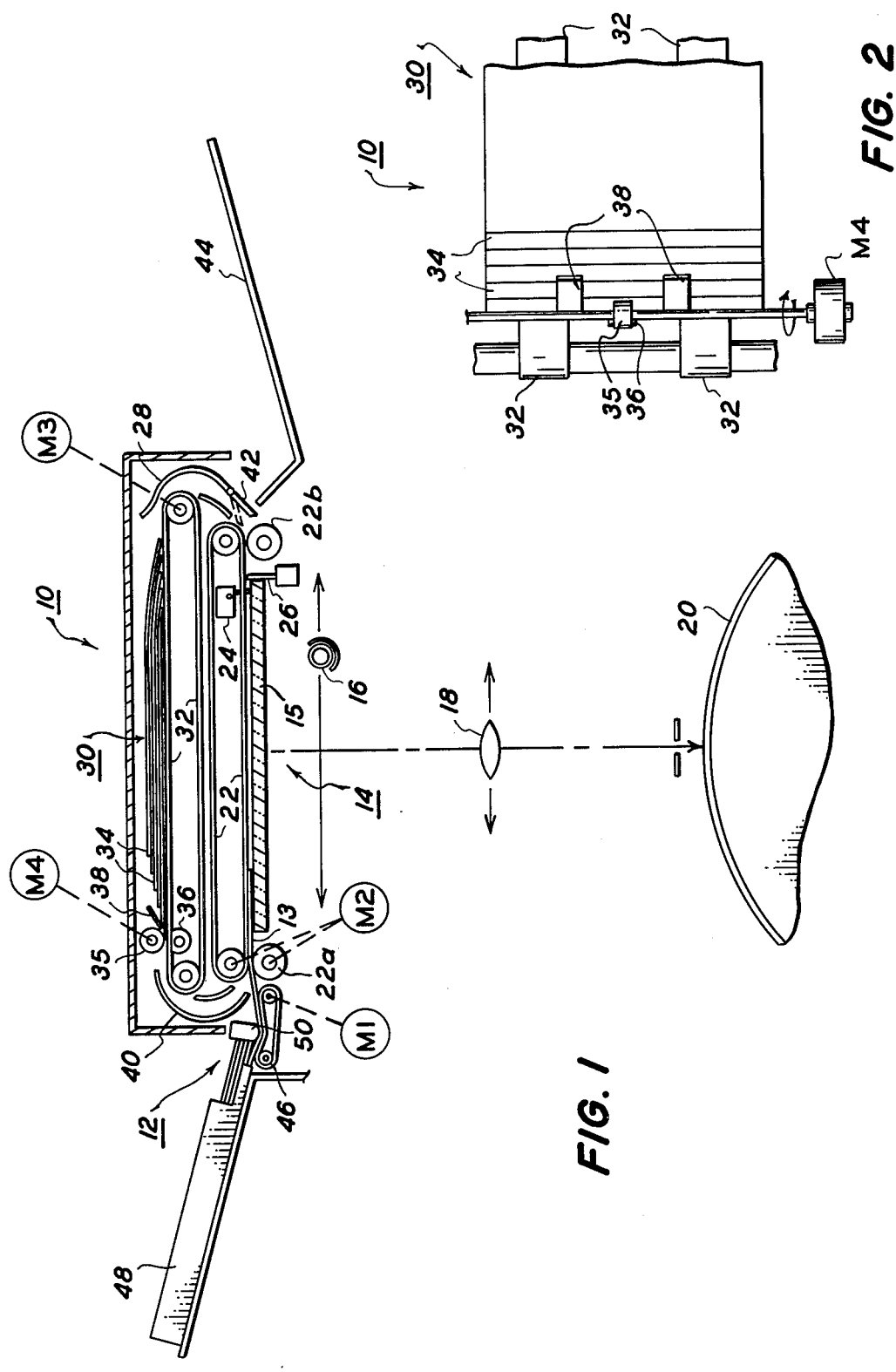

PRE-SEPARATED RECIRCULATING DOCUMENT COPYING SYSTEM

SUMMARY AND BACKGROUND OF THE INVENTION

This invention relates to a document handling system for copiers in which a set of individual documents may be maintained partially separated, but partially overlapping, during their recirculation to provide a compact system for the recirculative copying of individual documents.

For the faster xerographic and other document copiers now in commercial use, it is increasingly desirable to provide for automatic handling of the individual original documents being copied in order to utilize those higher speed copying capabilities. However, such documents can vary widely in sheet size, weight, thickness, material, condition, humidity, age, and value. The documents may have curls, wrinkles, tears, "dog-ears", cut-outs, overlays, paste-ups, tape, staples, adhesive areas, or other defects. Yet it is desirable to be able to automatically copy a set of documents with a mixture of sizes, types, and conditions. Further, it is desirable to automatically handle such documents with a relatively compact and inexpensive document handling system. Preferably the document handling system is one which may be placed over an existing or conventional external transparent copying platen (window) of a copier, and which can utilize the same existing or conventional optics system. That is, it is desirable that the automatic document handling system be readily removable from the platen area by the copier operator whenever desired to allow conventional manual copying of documents, such as books on the same copying platen.

An especially difficult document handling problem is the automatic separation of individual documents for copying from a stack or set of unseparated documents without damage to or wear of the documents. A desirable document separating system which lends itself to a compact and simple system is a retard type document separator as taught in U.S. Pat. No. 3,768,803, issued Oct. 30, 1973, to K. K. Stange. However, such retard type separators, if used to separate documents from the same document set a substantial number of times tend to cause wear to separation areas of the documents. Further, almost any type of document separator has an increased liklihood of document damage or document non-separation with an increase in the number of times separation is required, particularly for varied or defensive documents as described above.

Another highly desirable feature for an automatic document handling system for a copier is to provide document recirculation for pre-collation copying. As discussed, for example, in detail in U.S. Pat. No. 3,963,345 issued June 15, 1976, to D. J. Stemmle, et al., at Columns 1-4, such pre-collation copying systems provide a number of important advantages. The copies exit the copier in pre-collated sets, and do not require subsequent sorting in a sorter or collator. On-line finishing and/or removal of completed copy sets may be provided while additional copy sets are being made from the same document set. Any desired number of such copy sets may be made by making a corresponding number of recirculations of the document set in collated order past a copying station and copying each document once each time it recirculates.

However, a disadvantage of pre-collation copying systems is this fact that the documents must all be repeatedly recirculated and repeatedly individually copied the number of times equivalent to the desired number of copy sets. Thus, for example, to make 10 copy sets of a 5 (page) document set or book, one copy at a time would be made of each of the 5 document pages in this order: Pages 1, 2, 3, 4, 5; 1, 2, 3, 4, 5, etc.; repeated a total of 10 times to make the desired 10 copy sets. For bi-directional pre-collation copying this document copying sequence would, instead, be 1, 2, 3, 4, 5; 5, 4, 3, 2, 1; 1, 2, 3, 4, 5; etc. Thus, it may be seen that increased document handling is necessitated for a pre-collation copying system, as compared to a conventional post-collation copying system in which all the desired copies are made at one time from each document page and collated subsequently. In such a post-collation copying system the document set need only be circulated once to fill the bins of the copy sheet sorter or collator with the number of copy sets desired (limited in number, however, to the number of bins).

The increased document handling required for a pre-collation copying system increases the liklihood of document damage or wear, and particularly aggrevates the above-noted problems of document separation. A pre-collation copying system renders much more undesirable a document handling system in which the individual documents must be separated from the remainder of the documents in the document set for each recirculation thereof. Thus, it is highly desirable to have the documents pre-separated in some manner prior to their multiple recirculation for copying. One such system is disclosed in the above-cited U.S. Pat. No. 3,963,345 on pre-collation copying.

The present invention is intended to overcome or minimize the above-discussed problems and disadvantages. It provides a simple, compact, automatic pre-collation document handling system in which the individual documents are effectively maintained pre-separated for any desired number of recirculations, yet in which the document set may be maintained in a compact manner, and recirculated in a short and simple document handling path, to minimize document damage, and to maximize the ability to reliably recirculate different or defective documents, and to reliably copy each individual document sheet on each document recirculation. The system disclosed herein is particularly suitable for, and compatible with, conventional copier platens and optics systems. It is also suitable for use as a removable or auxilary document handling system, removably overlying an existing or conventional platen to selectively allow use of that same platen and its associated optics for manual or other non-pre-collation copying. However it is not limited thereto.

PRIOR ART STATEMENT

The recirculation of a plurality or set of individual pre-separated documents past an imaging station of a copier in pre-collated order to make multiple collated copy sets from the documents, including scroll means for temporarily storing the documents, maintained fully separated, between recirculations is disclosed in above-cited U.S. Pat. No. 3,963,345, issrued June 15, 1976, to D. J. Stemmle, et al., or U.S. Pat. No. 4,008,956, issued Feb. 22, 1977, by D. J. Stemmle. Other art on pre-collation copying, and teachings of the principles and advantages thereof, are discussed in those patents and are incorporated by reference herein. For example, other art of particular interest to the present invention, in which the documents are also pre-separated and maintained separated during their multiple recirculations, in U.S. Pat. No. 2,822,172, issued Feb. 4, 1958 to C. R. Mayo, et al., and U.S. Pat. No. 3,799,537, issued Mar. 26, 1974, to H. W. Cobb. Such pre-separation overcomes the serious problems discussed above of the potential damage or wear to the documents from a repeated separation process. With pre-separation the separation need only be provided once (initially) rather than each time the document set is recirculated for copying. The present invention is believed to provide significant advantages for its particular unique and novel pre-separation maintaining recirculation system.

Patents disclosing pre-collation document handling systems in which the individual documents are reseparated from the document set upon each recirculation of the document set for copying are obviously of lesser interest. They may be of general interest to the extent they show various sheet conveying or document handling systems which may be utilized in part in various possible embodiments of the present invention. They may also show means for withdrawing a document from the bottom of the set stack for copying and returning it to the top of the stack. Some examples include U.S. Pat. Re. No. 27,976, (originally U.S. Pat. No. 3,499,710, issued Mar. 10, 1970, to L. W. Sahley), U.S. Pat. No. 3,552,739, issued Jan. 5, 1971, to R. R. Roberts, et al., U.S. Pat. No. 3,536,320 issued Oct. 27, 1970, to D. R. Derby, U.S. Pat. No. 3,556,511, issued Jan. 19, 1971, to A. Howard, et al., and U.S. Pat. No. 3,937,454, issued Feb. 10, 1976, to R. H. Colwill. A recent pre-collation copying system of this type particularly noted is shown in Belgian Patent No. 835,568 laid open May 13, 1976, and West German patent application No. 2,550,985 published May 26, 1976, and French application Publication No. 2,291,131, laid open Nov. 12, 1976, all based on U.S. Ser. No. 523,610, filed Nov. 13, 1974 and now abandoned.

Of even lesser interest, except, again, for document handling structures per se, are patents disclosing single pass (non-recirculating and non-precollation) document or copy sheet feeding systems for copiers in general, such as U.S. Pat. No. 3,623,806, issued Nov. 30, 1971, to J. M. Short, U.S. Pat. No. 3,909,128, issued Sept. 30, 1975, to L. R. Sohm, U.S. Pat. No. 3,844,552, issued Oct. 29, 1974 to C. D. Bleau, U.S. Pat. No. 3,910,570, issued Oct. 7, 1975, to C. D. Bleau, etc.

Various prior art structures are known for providing for the shingled output of copies or sets of copies. For example, U.S. Pat. No. 2,863,663, to A. J. Richards, issued Dec. 9, 1958. U.S. Pat. No. 3,776,544, issued Dec. 4, 1973, to D. W. Watson on an automatic loading apparatus states that gates 48 there serve to rearrange stacked articles carried by conveyor 38 into shingled or overlapping relationship. The lateral off-setting of entire output sets of pre-collated copies, i.e., in a staggered set stack, is shown in U.S. Pat. No. 3,630,607, to H. Korn, et al., issued Dec. 28, 1971. However, none of these patents cited herein teach or suggest the automatic shingling of documents being copied in an automatic document recirculation system.

An exemplary embodiment of the present invention is shown and described hereinbelow as incorporated into an otherwise conventional exemplary xerographic apparatus and process. Accordingly, said xerographic apparatus and process itself need not be described in detail herein, since various publications, patents, and known apparatus are available to teach details thereof to those skilled in the art. For example, examples of known stationary document scanning type optics systems, moving document fixed optics systems, flash illumination full frame illumination optics systems, and variable magnification systems therefor, for imaging documents in copier systems are disclosed in various patents. For example, U.S. Pat. No. 3,775,008, issued Nov. 27, 1973, to R. A. Schaeffer, et al., and U.S. Pat. No. 3,832,057, issued Aug. 27, 1974, to D. K. Shogren, are examples of the former. The above-cited U.S. Pat. No. 3,552,739 to R. R. Roberts or U.S. Pat. No. 3,909,128 to L. R. Sohm contain examples of moving document optics systems. The present invention is adaptable to various such document imaging systems. Various structures and teachings from all of the patents cited in this application may be incorporated by reference in this specification to the extent appropriate.

BRIEF DESCRIPTION OF THE DRAWINGS

Further objects, features and advantages of the present invention pertain to the particular apparatus and steps whereby the above-mentioned aspects of the invention are obtained. Accordingly, the invention will be understood by reference to the following description and to the drawings forming a part thereof, which are approximately to scale, and wherein:

FIG. 1 is a side view of an exemplary automatic document recirculation system, in accordance with the present invention, in a conventional xerographic copying apparatus; and FIG. 2 is a partial top view of the document handling system embodiment of FIG. 1, with the cover removed for clarity.

DETAILED DESCRIPTION OF A PREFERRED EMBODIMENT

FIGS. 1 and 2 illustrate one example of the present invention. It will be appreciated that the subject document recirculation system may have other different orientations and structures, and different combinations with different exemplary xerographic or other copying systems and optics systems thereof, as noted above.

There is shown in FIGS. 1 and 2 a fully automatic and compact document handling system 10 into which a set of documents may be loaded, contained, and automatically recirculated by a desired number of recirculations. The individual documents are exposed for copying in each recirculation of the document set. The documents illustrated herein are conventional full size sheets of paper.

The documents may be loaded into the copier 10 at a loading or input area 12. As shown in FIG. 1, individual documents such as 13 are then carried through the optical imaging station 14 of a conventional optics system integral the copier. This is shown schematically in FIG. 1 by a copying image platen 15 exposed by scanning exposure lamp 16. A lens 18 focuses the image of the document being copied on the platen 15 onto a photoreceptor 20, preferably through a conventional mirror arrangement as shown in the patents noted above. As indicated above, while a stationary document, moving (scanning) optics flowing strip image optics system is illustrated here, it will be appreciated that alternatively, a moving document slit exposure, or a full frame instantaneous flast exposure, illumination system may be utilized for copying the individual documents. Instead of a full document size flat platen 15, a curved platen or a small copying window or open area may be utilized in connection with such other optics scanning systems.

The document 13 to be copied is shown here transported onto, across, and off of the upper surface of the platen 15 by an endless conventional document belt system 22 driven by a drive motor M2, together with a document lead edge sensor 24 and a retractable lead edge registration gate 26. The lead edge of the document may be sensed at 24 to stop the drive motor M2, and raise the registration gate 26, thereby stopping the document 13 at the apropriate exposure position, controlled by the registration gate 26. Mating rollers 22a and 22b engage the document transporting lower flight of the belt 22 at its entrance and exit areas, respectively, to provide document nips there. Further details and examples of suitable belt or other systems for handling a document for its imaging are given in various of the above-cited patents, and also in U.S. Pat. No. 3,941,376, issued Mar. 2, 1976, to K. Liechty, et al. (relating to the Xerox 9200 duplicator), and in allowed U.S. Pat. application Ser. No. 632,426, filed Nov. 17, 1975, by P. T. Ferrari now U.S. Pat. No. 4,030,694 issued July 5, 1977. Also illustrated in that application is a hinged mounting arrangement at the rear of the unit, which may be provided here, to allow the selective pivoting of the entire document handling unit away from the platen, thereby allowing unobstructed manual copying on the platen.

As the individual document is ejected from the platen 15 by the belt system 22 after it has been copied on the platen, the document is guided and turned over in a 180° semi-circular path by a curved baffle or paper guide 28. Then the document is immediately stacked onto the top of a shingled set 30 of all of the other individual documents being recirculated.

This document set 30 is supported on, and transported by, a second, separate, belt transport system 32, differently driven by motor M3. It will be noted that the belt system 32 and the belt system 22 have approximately the same dimensions and are parallel and continuously closely adjacent one another. Both closely overlay the platen 15 with the belt system 32 overlying the belt system 22. Each belt system is a simple basically planar one supported and driven by end rollers mounted adjacent the edges of the platen. Preferably the belt 22 is a single one with dimensions greater than the platen in both directions, while the belt 32 is two separated belts as shown in FIG. 2. It may be seen that the overall automatic document handling system 10 is not substantially larger than these two belt systems and the cover shown enclosing the entire unit.

The motor M3 incrementally advances the second belt system 32 by a brief distance (e.g., one centimeter) once before each document received from the belt unit 22 is stacked on the top of the set 30. This short belt 32 movement each time another document is placed on belt 32 causes each document in the set 30 to be off-set or shingled relative to all of the other documents in the set 30. That is, all the documents in the set 30 are in a partially separated but mostly overlapping or overlying configuration. Preferably, all of the documents, except the one actually being copied, in the entire set of documents being recirculated, are maintained in this shingled set 30 on the belt system 32.

This repeated brief sequential advancement of the document set 30 causes each document therein to have a corresponding individually exposed (partially separated) area 34 of a distance substantially less than the overall dimensions of the document. This lead edge area 34 is the same length (in the direction of document recirculation) as the incremental advance distance provided by the belt 32. It may be seen that the bottom or lower-most document in the staggered set 30 thus always has its exposed lead edge area 34 extending in advance of all the other documents in the set 30.

To advance an individual document being recirculated from the set 30 no reseparation of any of the documents is required. The shingled configuration of the set 30 is required. The shingled configuration of the set 30 is continuously maintained as the documents are recirculated, for all recirculations. This shingled document set configuration allows a simple, non-separating type document feeder to be utilized.

Here this is illustrated by the mating pair of feed rollers 35 and 36 shown in the top view of FIG. 2 as well as in the side view of FIG. 1. The feed rollers 35 and 36 may be driven by the motor M4, as shown, whenever it is desired to recirculate a document from the set 30 back onto the platen 15 for its individual copying. The incremental movement of the belt transport system 32 by the motor M3 advances only the lead edge area 34 of only the bottom-most document in the set 30 into the nip of the feed rollers 35 and 36. Thus, only this bottom-most document is grasped and driven off of the belt system 32 by the feed rollers 35 and 36. The document feed rolls 35 and 36 positively grasps or pinches only the bottom document sheet, and no other document each time it operates. The nip of the feed rollers 35 and 36 may be automatically fully opened, if desired, each time the document lead edge area 34 is incremented theretoward, so as to expedite the positive entry of each sheet well into the nip before it closes. (This cyclic nip-opening may also be provided for the opposing drive or idler rollers 22a and 22b in juxtaposition with the lower flight of the belt system 22 in FIG. 1).

As shown in FIG. 2, the belt system 32 preferably comprises two (or more) spaced individual belts so that the feed rollers 35 and 36 may be mounted therebetween, i.e., so the belt system 32 does not pass through the nip of the feed rollers 35 and 36, only the documents. This desired spacing between belts is exaggerated here in FIG. 2. This split-belt system also enables the feed rollers 35 and 36 to be centrally located with respect to the lead edge of the document to provide a single and central point non-skewed pulling out of the bottom document in the set 30 out from under all of the other overlying documents in the set 30. It will be appreciated that various other document feeding mechanisms such as belts, grippers, or the like may be utilized instead of the feed rollers 35 and 36.

The pulling out of the bottom document, while the other documents remain stationary relatively to their belt transport 32, may be assisted by providing a relatively low coefficient of friction for the belt system 32. It may also be assisted, as shown, by a forward baffle, gate, or retard fingers 38 adjacent the feed rollers 35 and 36. These retard fingers 38 are positioned to frictionally engage the lead edge area of at least the next adjacent (immediately overlying) document, thereby resisting and preventing the forward movement of all of the other documents in the set 30 when the bottom document is driven away by the feed rollers 35 and 36.

The above-described incremental advance distance (lead edge area 34 extension) of each document in the set 30 is not critical. This minimum length or degree of shingling depends on the minimum capacity of the particular document feeding system to grasp the exposed area of only the one document, i.e., not to double-feed. To provide a capacity for the maximum number of documents in the smallest and most compact space, e.g., up to ten or more documents in an area overlying the platen, a minimized exposed lead edge length of approximately ½ to 1 centimeter is desirable. However, if the system is to accommodate a smaller number of documents in the set being recirculated, e.g., 1 – 6, then this lead edge extension of each document may be substantially increased, to several centimeters.

As the lower-most document in the set 30 is fed out therefrom by the feed rollers 35 and 36, it enters a second curved sheet guide or baffle 40 which again inverts the document in a short 180° curved path, and brings the lead edge of the document directly into the loading or input area 12. This places the document in the entrance to the first (platen overlying) belt system 22, for its transport onto the platen 15 for exposure and copying,. This second sheet baffle 40, together with the first baffle 28 at the opposite end of the platen, provide two inversions of each document in its recirculation and thereby always returns the document with the same orientation for copying, i.e., provide the same side facting the platen, as is well known for recirculating document handling systems.

It may be seen that the above described operation and steps may be endlessly repeated to provide any desired number of copying recirculations of the document set 30 in the system, and thereby provide any desired number of precollated output copy sets.

In operation, the automatic document recirculating system 10 continuously unshingles individual documents from the set 30, continuously individually copies those individual documents at the imaging station of the copier and then continuously reshingles those individual documents with the other documents being recirculated in the set 30.

The first or imaging belt transport system 22 advances each document being imaged here by a distance at least equal to the dimension of the document in its transport direction. This is a substantially greater distance of movement for each document than the short incremental advance movement of the second belt transport system 32. Thus, the documents are normally in an almost entirely overlapping configuration in the set 30. The set 30 dimensions are no longer than the length of the individual exposed lead edges 34 times the number of documents in the set 30, and no wider than the widest document, yet each document is effectively separated in the set 30. It may also be seen that the set 30 continuously uniformly overlies the platen 15 at the same basic position, because each time the set 30 is incrementally advanced, its forward-most or leading document is removed by the feed rollers 35 and 36 at its same location, and the trailing or rear-most document is replaced at its same location. Only a single document set 30 location is needed and desired, as opposed to two set stacking or scroll areas in some other systems.

Advantageously with this system, while one document is being removed from the bottom of the set stack 30 and fed onto the platen 15, simultaneously the immediately preceeding document may be being removed from the platen 15 and deposited on the set 30. This increases the copying through-put time or rate, or reduces the speed at which the documents must be moved, together with the short document path provided.

The endless document path here advantageously does not require a reversal in movement direction of any document at any time. Further, the system may be designed without any mechanical stops or obstructions against the lead edges of any documents by eliminating the registration gate or stop 26 and utilizing instead a known sensing and/or timing arrangement to stop the document 13 at the appropriate position.

After the desired number of document recirculations have been provided, i.e., after the desired number of copy sets have been made, all of the documents in the document set may be automatically ejected here after their last copying, as a part of the last document recirculation. This is accomplished here by pivoting the deflector finger 42 of FIG. 1 into the illustrated dashed line position, where it is not in the path of the documents as they exit the platen 15, to cause the documents to eject into, and stack in, a document exit tray 44. The deflector finger 42 here is shown as a pivotable lower segment of the first paper guide 28.

Turning now to the initial loading of the set of documents to be recirculated into the automatic document handling system 10, this may be done manually or semi-automatically at the input area 12. However, preferably, as shown here, a conventional automatic document sheet feeder 46 is driven by motor M1 to load individual sheets into the document handler 10 from a set of documents placed in a document input tray 48. The input feeder 46 here includes a retard separator 50 for separating and sequentially feeding only individual sheets from the bottom of the unseparated, unshingled, stack of sheets placed in the input tray 48. This retard separator 50 may be of the type taught in the previously cited U.S. Pat. No. 3,768,803 to K. K. Stange. With the system here, the documents are sequentially loaded in order directly onto the platen 15, and thus a "proof-set" of copies may be completed as the loading of the document set is accomplished.

It will be appreciated that the motors M1 - M4 illustrated may be gear, cam, clutch, etc., driven elements from only one or more power sources, rather than separate motors, as shown in various of the above-cited references.

In conclusion it may be seen that there has been described here an improved automatic original document recirculation system for providing pre-collated copy sets. As described, document separation is only performed once on each document, when it is initially fed into the document recirculation loop. After that, the documents are kept separated by the slight off-set amount by which they are shingled. This exposed pre-separated lead edge area of each sheet is then grasped by a simple single sheet document feeder, without requiring the use of any sheet separators, which could cause wear or damage to the documents. With this arrangement, a pre-collation recirculating document handler of simple and compact design may be provided, the dimensions of which are only slightly greater than the dimensions of the platen itself, yet ten or more document pages may be retained therein and recirculated almost indefinitely to provide any desired number of copy sheet sets of said ten or more pages. The improved reliability in maintaining individual sheet separation and preventing double sheet feeds, etc., by said pre-separation also improves the reliability of maintenance of the collation (page order) of the documents within the document set.

While the exemplary embodiment described herein is presently considered to be preferred, various other modifications or improvements will be apparent to those skilled in the art. The following claims are intended to cover all such variations and modifications as fall within the true spirit and scope of the invention.

What is claimed is:

1. In an automatic document handling system for recirculating a plurality of individual documents having pre-selected dimensions past an imaging station of a copier in a pre-collated order for making multiple collated copy sets from the documents, the improvement comprising:

document recirculation means for recirculating a plurality of individual documents toward and away from the imaging station while maintaining a separation between individual documents by shingling the documents in a partially separated, partially overlapping, configuation during a portion of said recirculation, wherein a portion of said document recirculation means comprises a document transport which sequentially incrementally advances the documents transported thereon by a distance substantially less than a dimension of a document to provide said shingling.

2. The automatic document handling system of claim 1, wherein said document recirculation means includes document feeding means for feeding a document through said imaging station, wherein said document feeding means advances each document being imaged by a distance at least a dimension of a document and substantially greater than said incremental advance of said document transport providing said shingling.

3. The automatic document handling system of claim 1, further including document separation means for initially pre-separating documents prior to the recirculation of the documents on said document recirculation means.

4. The automatic document handling system of claim 1, wherein said document recirculation means includes:

document feeding means for feeding separated documents individually across said imaging station, shingling means for receiving documents from said feeding means and stacking said documents in a partially separated, but substantially overlapping shingled configuration, and advancing means for engaging a partially separated portion of an individual document from said shingling means and fully separating and advancing the individual document so engaged towards said imaging station.

5. The automatic document handling system of claim 4, wherein said advancing means advances the individual document to said document feeding means.

6. The automatic document handling system of claim 4, wherein said shingling means comprises said document transport which incrementally advances the documents transported thereon by a distance substantially less than a dimension of a document to provide said shingling.

7. The automatic document handling system of claim 4, further including document separation means for initially pre-separating documents prior to the recirculation of the documents on said document recirculation means.

8. The automatic document handling system of claim 4, further including document separation means for initially pre-separating documents prior to the recirculation of the documents on said document recirculation means, wherein said advancing means advances the individual document to said document feeding means, wherein said shingling means comprises a document transport which incrementally advances the documents transported thereon by a distance substantially less than a dimension of a document to provided said shingling, wherein said imaging station comprises a copying platen, wherein said document feeding means removably overlies said platen, wherein said shingling means overlies said document feeding means and said platen substantially coextensively therewith and wherein said shingling means has a document input means and document output means at opposite ends thereof operatively connecting with said document feeding means to provide an endless document recirculation loop path therewith.

9. In an automatic document handling method in which a plurality of individual original documents having pre-selected dimensions are recirculated past an imaging station of a copier in a pre-collated order to make multiple collated copy sets, the improvement comprising:

recirculating a plurality of documents toward and away from the imaging station while maintaining a separation between individual documents by shingling a plurality of the documents in a partially separated, partially overlapping, configuration during said recirculation, wherein the documents being recirculated are incrementally advanced by an incremental distance substantially less than a dimension of the document to provide said shingling, and then individually advanced through said imaging station by a distance substantially greater than said incremental distance.

10. The automatic document handling system of claim 9, wherein individual documents are unshingled and individually copied at said imaging station and then reshingled with other documents being recirculated.

11. The automatic document handling method of claim 9, further including initially automatically pre-separating the documents prior to the recirculation of the documents.

12. The automatic document handling method of claim 9, wherein pre-separated documents are individually fed across said imaging station and then stacked in a partially separated, but substantially overlapping, shingled set, and then the partially separated portions of individual documents from said shingled configuration are engaged to separate and advance the individual document so engaged towards said imaging station for said individual feeding across said imaging station.

13. In an automatic document handling method in which a plurality of individual original documents having pre-selected dimensions are recirculated past an imaging station of a copier in a pre-collated order to make multiple collated copy sets, the improvement comprising:

recirculating a plurality of documents toward and away from the imaging station while maintaining a separation between individual documents by shingling a plurality of the documents in a partially separated, partially overlapping, configuration during said recirculation, wherein the documents are individually stacked on the top of a generally horizontal shingled pile of documents which is incrementally advanced between the stacking of each individual document to provide said shingling, and wherein the documents are individually removed from the bottom of said pile by engaging the partially separated portions thereof and individually copied at the imaging station and then individually restacked on the top of the shingled pile.

* * * * *